(12) United States Patent
Pruett (10) Patent No.: US 11,173,405 B2
(45) Date of Patent: Nov. 16, 2021

(54) DEVICES, SYSTEMS, AND METHODS FOR DISTRIBUTED GAME ARCHITECTURE

(71) Applicant: Arrow Electronics, Inc., Centennial, CO (US)

(72) Inventor: Christian Pruett, Castle Rock, CO (US)

(73) Assignee: Arrow Electronics, Inc., Centennial, CO (US)

( * ) Notice: Subject to any disclaimer, the term of this patent is extended or adjusted under 35 U.S.C. 154(b) by 27 days.

(21) Appl. No.: 16/711,090

(22) Filed: Dec. 11, 2019

(65) Prior Publication Data

US 2021/0178276 A1 Jun. 17, 2021

(51) Int. Cl.
| | |
|---|---|
| A63F 9/24 | (2006.01) |
| A63F 11/00 | (2006.01) |
| G06F 13/00 | (2006.01) |
| G06F 17/00 | (2019.01) |
| A63F 13/80 | (2014.01) |
| A63F 13/5375 | (2014.01) |
| A63F 13/49 | (2014.01) |
| G09B 19/02 | (2006.01) |
| A63F 13/44 | (2014.01) |
| A63H 37/00 | (2006.01) |
| A63F 13/24 | (2014.01) |

(52) U.S. Cl.
CPC .............. *A63F 13/80* (2014.09); *A63F 13/44* (2014.09); *A63F 13/49* (2014.09); *A63F 13/5375* (2014.09); *G09B 19/025* (2013.01); *A63F 13/24* (2014.09); *A63F 2300/302* (2013.01); *A63F 2300/554* (2013.01); *A63F 2300/6081* (2013.01); *A63F 2300/638* (2013.01); *A63F 2300/8094* (2013.01); *A63H 37/00* (2013.01)

(58) Field of Classification Search
USPC .................... 463/3, 9, 10, 13, 20, 22, 25, 39
See application file for complete search history.

(56) References Cited

U.S. PATENT DOCUMENTS

| | | | |
|---|---|---|---|
| 2,601,281 A | 6/1952 | Hartley et al. | |
| 3,710,455 A | 1/1973 | Liversidge et al. | |
| 4,241,923 A | 12/1980 | Meirovitz | |
| 4,630,831 A * | 12/1986 | Stadden | A63F 9/20 273/292 |
| 2010/0093444 A1* | 4/2010 | Biggar | G07F 17/3295 463/43 |
| 2014/0221066 A1* | 8/2014 | McCord | A63F 9/183 463/9 |
| 2014/0274260 A1* | 9/2014 | Chodniewicz | A63F 9/183 463/13 |

* cited by examiner

*Primary Examiner* — Adetokunbo O Torimiro
(74) *Attorney, Agent, or Firm* — Sheridan Ross P.C.

(57) ABSTRACT

Devices, systems, and methods of the present disclosure are directed to providing a Science, Technology, Engineering, and Mathematics (STEM) based distributed games that allows two or more teams of players to develop mathematical and problem-solving skills. Game controllers allow each team to submit a number to a game device that performs one or more arithmetic operations on the set of numbers to compute a guess that is compared to a puzzle solution. If the guess equals the puzzle solution prior to a timer time period expiring, then the players win a reward, such as deploying a shower of confetti, providing candy, display of lights, conspicuous sounds, vibrations, and/or the like.

20 Claims, 6 Drawing Sheets

DEVICES, SYSTEMS, AND METHODS FOR DISTRIBUTED GAME ARCHITECTURE

FIELD

The present disclosure is generally directed to a distributed game architecture. More specifically, the present disclosure is directed to devices, systems, and methods to allow teams of players to participate in a distributed game.

BACKGROUND

Science, Technology, Engineering, and Mathematics (STEM) education integrates concepts from these multiple disciplines and applies these concepts to the real-world. One form of STEM education is STEM based games. STEM based games that teach mathematical and problem-solving skills are growing in popularity. STEM games encourage players, particularly children, to develop skills and interest in the core disciplines of science, technology, engineering, and mathematics while being entertaining.

DETAILED DESCRIPTION

Example embodiments relate to a game device such as a distributed binary calculator (DBC) and game controllers.

In more detail, at least one example embodiment comprises a DBC that allows two or more teams to each enter a binary number, and the DBC performs one or more arithmetic operations (e.g., addition, subtraction, multiplication, division, etc.) or logic operations (e.g., bitwise AND, OR, XOR, NOT, NAND, NOR, SHIFT LEFT, SHIFT RIGHT, etc.) to combine the binary numbers into a guess that is compared to a puzzle solution. If the guess equals the puzzle solution prior to a timer timeout period expiring, then the players win a reward, such as deploying a shower of confetti, providing candy, display of lights, conspicuous sounds, vibrations, and/or the like. Additionally or alternatively, the number of guesses may be limited to a predetermined number over an unlimited time period or within a predetermined time period.

A binary number is a number expressed in the base-2 numeral system that uses two symbols, typically "0" and "1." For example, the decimal number 5 may be represented as an eight digit binary number Ob00000101. Adding decimal numbers 5 (Ob00000101) and 6 (Ob00000110) results in 11 (Ob00001011). Similarly, performing the logical bitwise AND operation on decimal numbers 5 and 6 results in decimal number 4 (Ob00000100).

In general, example embodiments are directed to two parts: firstly, a game controller for each team of players; and secondly, a game device to perform the DBC function. Each game controller may allow a team to enter a binary number. The game device may calculate the guess periodically (e.g., by polling the controllers) or continuously as each binary number is received by the game device from a game controller.

Each game controller may be electrically connected to the game device, communicate wirelessly with the game device, or communicate through a wired and/or wireless communication network.

A team of players must be able to view the binary number entered by each of the other teams. In some embodiments, all of the teams are in view of each other's game controller. In other embodiments, each team of players receives the binary number entered by each of the other teams either from the corresponding game controller or via the game device. The received numbers may be displayed on the game controller, the game device, or other device (e.g., cell phones, smart phones, tablet computers, digital watches, hand-held devices, PDAs, or other types of computing devices).

The mathematical operations performed by the game device include addition, subtraction, multiplication, and/or division. Valid values for the solution are a function of the number of game controllers, the range of numbers each game controller may provide as input, and the numerical and logical operations that are performed by the game device. For example, when there are four game controllers where each game controller allows a team to enter a range of integer values in the closed integer interval [0, 255] and the mathematical operation is addition, the range of solutions is the closed integer interval [0, 1020].

According to at least one example embodiment, one or more of the game controllers may perform the functions of the game device. For example, one game controller may be assigned or elected as the master game controller and perform the functions of the game device for all of the game controllers. Alternatively, the functions of the game device may be distributed to two or more game controllers.

An instructor may enter the puzzle solution and game mode into the game device, provide instructions/rules prior to game play, provide hints and/or more instructions during game play, coordinate game play by announcing when to submit a number, and/or perform the reward or end game operation. For example, the instructor may provide candy to the teams that successfully deduce the puzzle solution.

Example embodiments will be described with reference to specific hardware and/or software components for a distributed game, however, it should be appreciated that example embodiments may be applied to other configurations of hardware and/or software for the distributed game.

Figure 1:
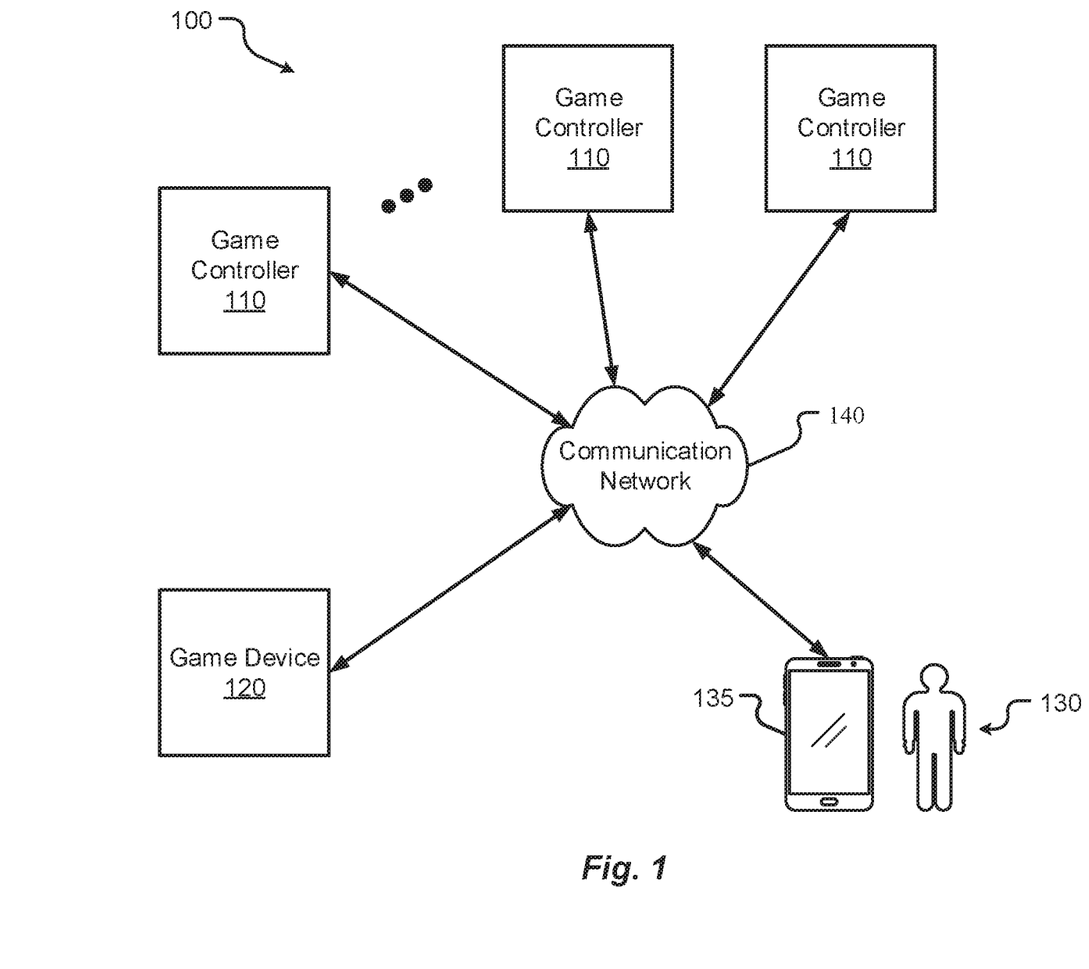
FIG. 1 illustrates a system according to at least one example embodiment.

FIG. 1 illustrates a system 100 according to at least one example embodiment. The system 100 may include one or more game controllers 110, a game device (e.g., a distributed binary calculator) 120, an instructor 130, a communication device 135, and a communication network 140.

The game controller 110, game device 120, and communication device 135 may be computing devices such as a desktop, a laptop, a tablet, a smart phone, or other suitable device that may communicate through the communication network 140. The game controller 110 is described in more detail in FIGS. 2A-2D, and the game device 120 is described in more detail in FIGS. 3A-3D. The instructor 130 may use the communication device 135 to communicate with the teams of players and/or configure the game device 120.

The communication network 140 can be or may include any collection of communication hardware and software that can send and receive electronic communications, such as the Internet, a standard Plain Old Telephone System (POTS), the Public Switched Telephone Network (PSTN), a Wide Area Network (WAN), a Local Area Network (LAN), a Voice over IP Network (VoIP), a packet switched network, a circuit switched network, a cellular network, a combination of these, and the like. The communication network 140 can use a variety of electronic protocols, such as Ethernet, Internet Protocol (IP), Session Initiation Protocol (SIP), Integrated Services Digital Network (ISDN), Hyper Text Markup Language (HTML), Java Script, Web Real-Time Communication (WebRTC), and/or the like. Information may be transmitted over the communication network 140 using technologies such as Wi-Fi, Bluetooth©, ZigBee, GSM, LTE, Ethernet, or any other wired or wireless communication protocol. In some embodiments, the game controllers 110 and game device 120 communicate directly using wired protocols (UART, USART, USB, and/or the like) or direct wireless protocols (e.g., Bluetooth©, Wi-Fi Direct, ZigBee, Z-Wave, and/or the like). The communication network 140 is shown as one cloud but may include one or more communication paths, devices, and/or protocols.

Figure 2A:
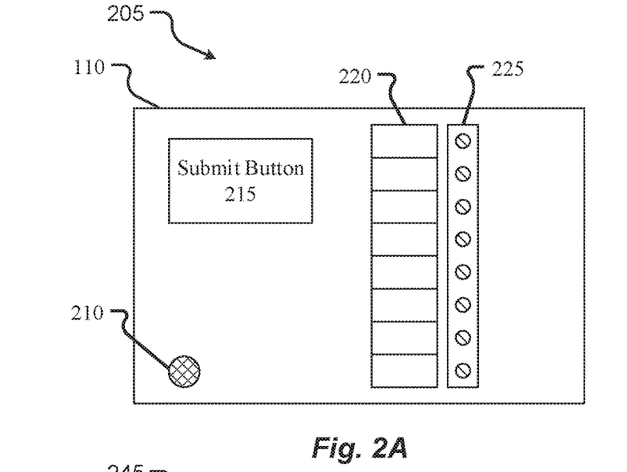
FIG. 2A illustrates a side view of a game controller in accordance with at least one embodiment of the present disclosure.

FIG. 2A illustrates a side view 205 of a game controller 110 in accordance with at least one embodiment of the present disclosure. The side view 205 of the game controller 110 may include a speaker 210, a submit button 215, a series of switches 220, and a series of light emitting diodes (LEDs) 225. As may be appreciated, the series of switches 220 and series of LEDs 225 may be substituted by a display (e.g., display screen of a mobile device).

In this example embodiment, the speaker 210 may be used to provide game instructions, game rules, and/or game hints. The speaker 210 may also be used to provide an audible indication of a reward, the game timer 390 expiring, as shown in FIG. 3D, and/or an incorrect guess provided by the teams of players.

When pressed, the submit button 215 may indicate that the number entered via the series of switches 220 is final and ready for transmission to the game device 120. The game controller 110 may transmit the number that is entered to the game device 120. Alternatively, the number entered may be transmit each time a switch in the series of switches 220 is opened or closed (i.e., real-time).

In the example embodiment, the series of switches 220 (e.g., buttons, pushbutton switches, selector switches, joystick switches, etc.) includes eight switches where each switch corresponds to a binary digit of an eight digital binary number. Each LED in the series of LEDs 225 correspond to the state of one of the binary switches (e.g., switch 1 closed corresponding to LED 1 being on, and switch 1 open corresponding to LED 1 being off, etc.). The series of switches 220 may be interpreted as an eight digit unsigned binary number or a seven digit binary number that includes a sign bit. The game controller 110 may transmit the states of the series of switches 220 as a binary or decimal number to the game device 120 as input used to calculate the guess during game play as described above.

Figure 2B:
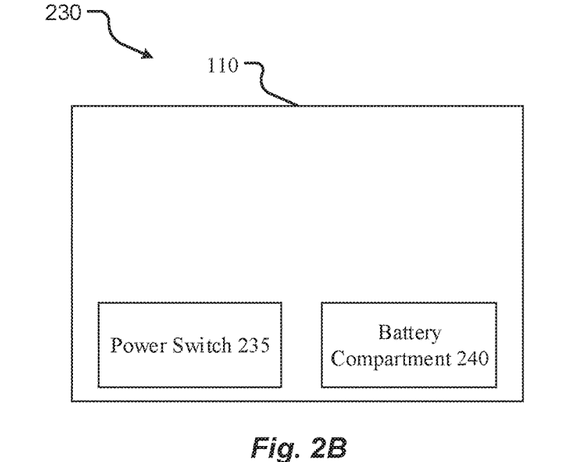
FIG. 2B illustrates a bottom view of a game controller in accordance with at least one embodiment of the present disclosure.

FIG. 2B illustrates a bottom view 230 of a game controller 110 in accordance with at least one embodiment of the present disclosure. The bottom view 230 of a game controller 110 may include a power switch 235 and a battery compartment 240.

When closed, the power switch 235 may provide power to the game controller 110. Electrical power may be provided by a power source 280 (e.g., a battery) that may be contained in the battery compartment 240. Additionally or alternatively, a power converter circuit (not shown) may be used to convert an external power source to a source of electrical power required by the game controller 110.

Figure 2C:
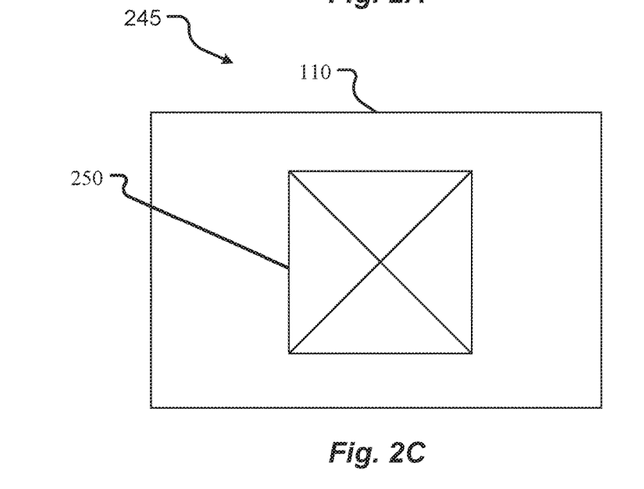
FIG. 2C illustrates a top view of a game controller in accordance with at least one embodiment of the present disclosure.

FIG. 2C illustrates a top view 245 of a game controller 110 in accordance with at least one embodiment of the present disclosure. The top view 245 of the game controller 110 may include a reclosable hatch 250 that may be used to provide a reward upon successfully solving the game puzzle. For example, the reclosable hatch 250 may be spring loaded and provide a shower of confetti as a reward.

Figure 2D:
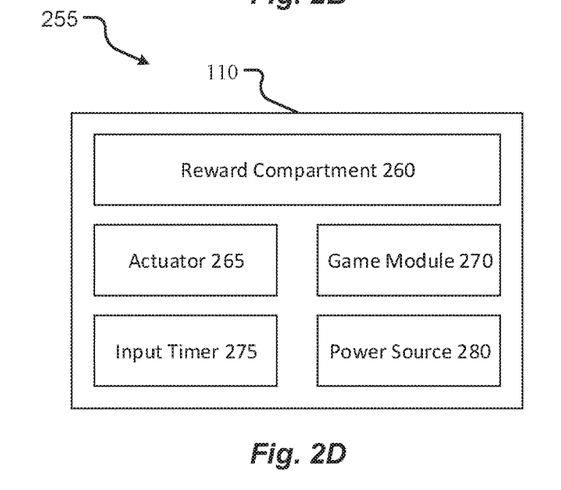
FIG. 2D illustrates a block diagram of a game controller in accordance with at least one embodiment of the present disclosure.

FIG. 2D illustrates a block diagram 255 of a game controller 110 in accordance with at least one embodiment of the present disclosure. The block diagram 255 of the game controller 110 may include a reward compartment 260, an actuator 265, a game module 270, an input timer 275, and a power source 280.

The reward compartment 260 may contain the reward that is provided upon successfully solving the game puzzle and be coupled to the reclosable hatch 250, as shown in FIG. 2C, to allow players access to the reward. The actuator 265 may be a mechanism (e.g., a release valve) to open the reclosable hatch 250 by unlatching a hook (not shown). The reward may include providing candy from the reward compartment 260, shower of confetti from the reward compartment 260, a display of lights (e.g., flashing the series of LEDs 225), vibration (e.g., using a tactile haptic feedback device), conspicuous sounds via the speaker 210, and/or the like.

Figure 4:
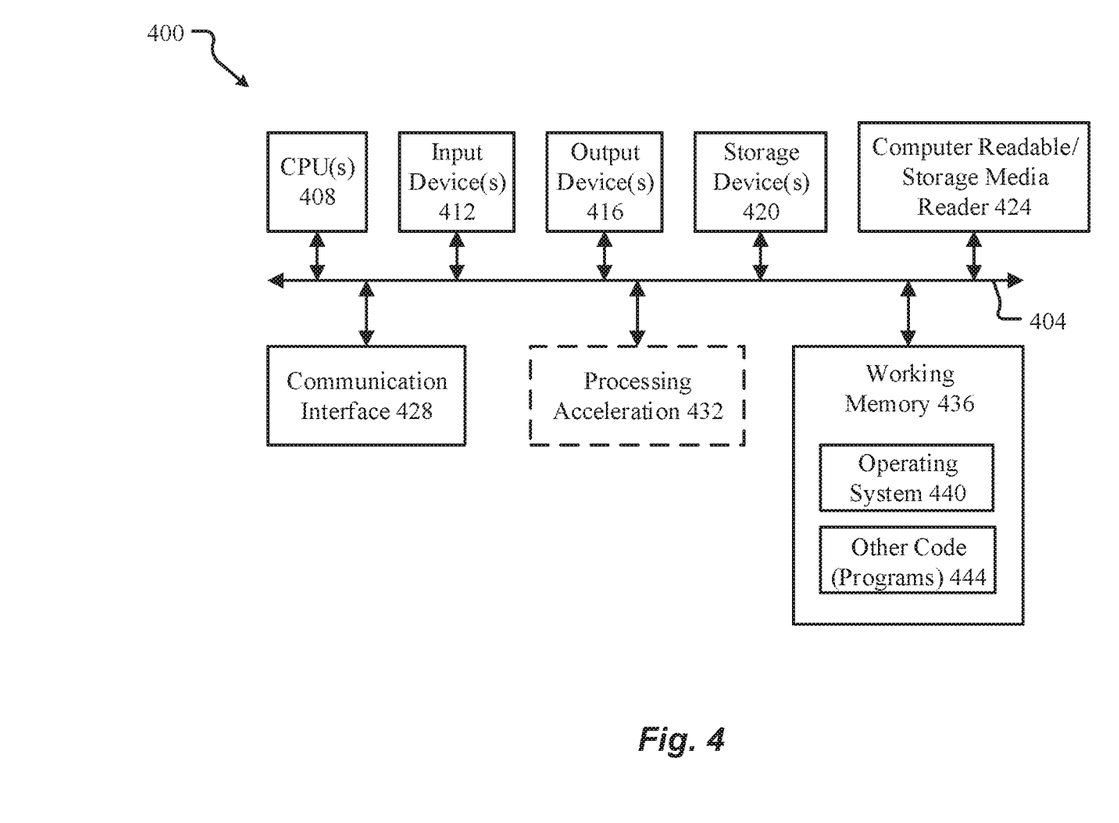
FIG. 4 illustrates a block diagram of a system in accordance with at least one embodiment of the present disclosure.
Figure 5:
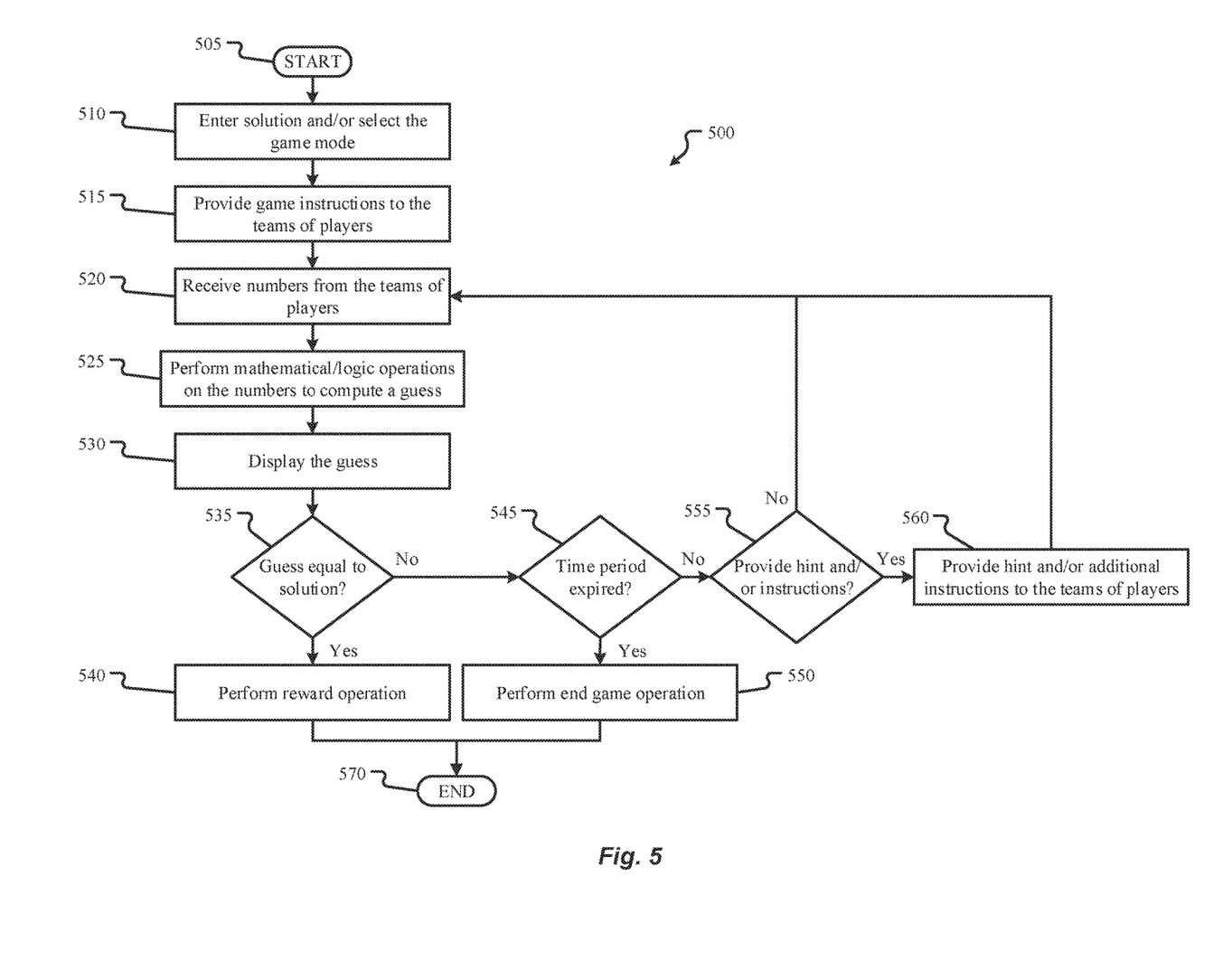
FIG. 5 illustrates a method according to at least one example embodiment.

The game module 270 may perform the communication and logic functions required by the game controller 110, including the method illustrated in FIG. 5, by executing instructions stored in working memory 436 and executed by the CPU(s) 408, as illustrated in FIG. 4.

The game controller 110 may also include an input timer 275 that provides a time period for the team to provide a number to the game device 120. Additionally or alternatively, the number of guesses may be limited to a predetermined maximum number of guesses.

The power source 280 may include a battery located in a battery compartment 240. Additionally or alternatively, a power converter circuit (not shown) may be used to convert an external power source to a source of power required by the game controller 110.

Figure 3A:
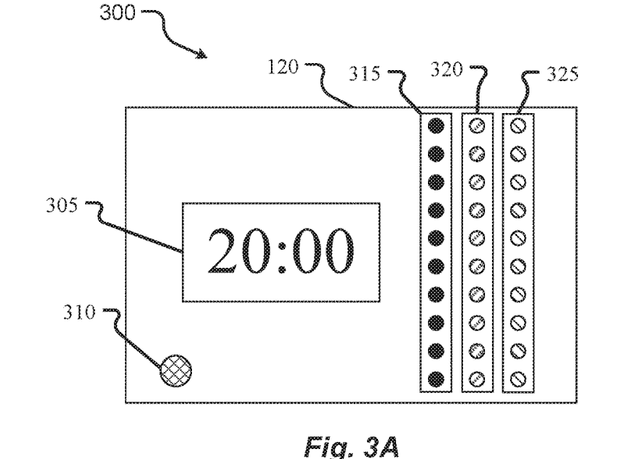
FIG. 3A illustrates a side view of a game device in accordance with at least one embodiment of the present disclosure.

FIG. 3A illustrates a side view 300 of a game device 120 in accordance with at least one embodiment of the present disclosure. The side view 300 of the game device 120 may comprise a display 305, a speaker 310, a controller set of LEDs 315, a hint set of LEDs 320, and a solution set of LEDs 325.

In this example embodiment, the display 305 may be used to provide a timer, instructions, rules, and/or hints to the teams of players. The game device 120 and display 305 may be a computing device such as a desktop, a laptop, a tablet, or other suitable device. As such, the display 305 may be an LED display, an LCD display, or other suitable display.

The speaker 310 may be used to provide game instructions, game rules, and/or game hints. The speaker 310 may also be used to provide an audible indication of a reward, the game timer 390 expiring, as shown in FIG. 3D, and/or an incorrect guess provided by the teams of players.

The controller set of LEDs 315 may be the computed guess, called the guess, that is a combination of all of the teams' submitted numbers. The hint set of LEDs 320 may provide a partial solution to the game puzzle as a hint to the teams of players. The solution set of LEDs 325 may provide the solution of the puzzle once game play ends. When the teams of players correctly guess the solution, the controller set of LEDs 315 will be lit in the same pattern as the solution set of LEDs 325 to indicate the numbers are equal.

Figure 3B:
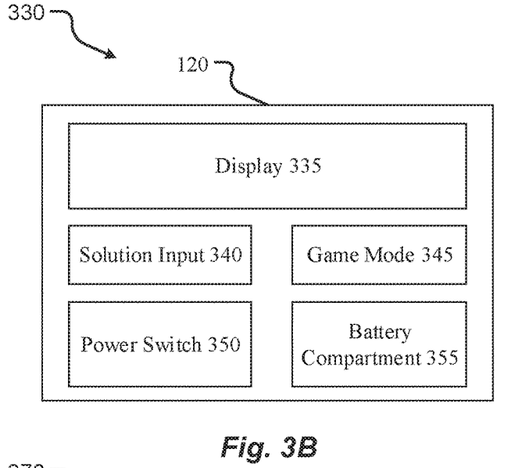
FIG. 3B illustrates a bottom view of a game device in accordance with at least one embodiment of the present disclosure.

FIG. 3B illustrates a bottom view 330 of a game device 120 in accordance with at least one embodiment of the present disclosure. The bottom view 330 of a game device 120 may include a display 335, a solution input 340, a game mode 345, a power switch 350 and a battery compartment 355.

The game device 120 may be coupled to the display 335 via a display interface connection (e.g., DVI, HDMI, etc.). Similar, if not identical, to the display 305, the display 335 may be an LED display, an LCD display, or other suitable display. The display 335 may be used by the instructor 130 to view the game puzzle solution, game mode, game instructions, etc.

The game puzzle solution may be entered by the instructor 130 using the solution input 340. The solution input 340 may be a series of switches similar to the series of switches 220 of the game controller 110 but may require additional switches to accommodate the larger closed integer interval. For example, as described above, the game device 120 may require ten switches to allow input of game solution integer values in the closed integer interval [0, 1020] when there are four game controllers 110 with eight switches comprising the series of switches 220.

The game mode 345 may determine the mathematical and logical operations performed on the submitted numbers to compute the guess for the teams of players. For example, all of the numbers may be summed to produce a guess. The game mode 345 may also determine whether a timer is used during game play to limit play to a predetermined time period and/or whether the number of guesses is limited to a predetermined number.

When closed, the power switch 350 may provide power to the game device 120. Electrical power may be provided by a power source 395 (e.g., a battery) that may be contained in the battery compartment 355. Additionally or alternatively, a power converter circuit (not shown) may be used to convert an external power source to a source of electrical power required by the game device 120.

Figure 3C:
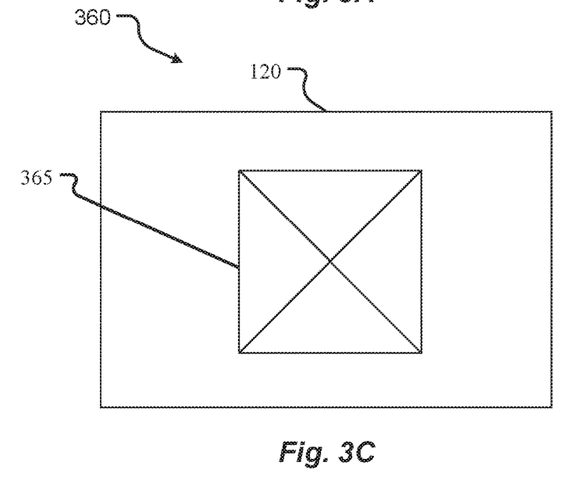
FIG. 3C illustrates a top view of a game device in accordance with at least one embodiment of the present disclosure.
Figure 3D:
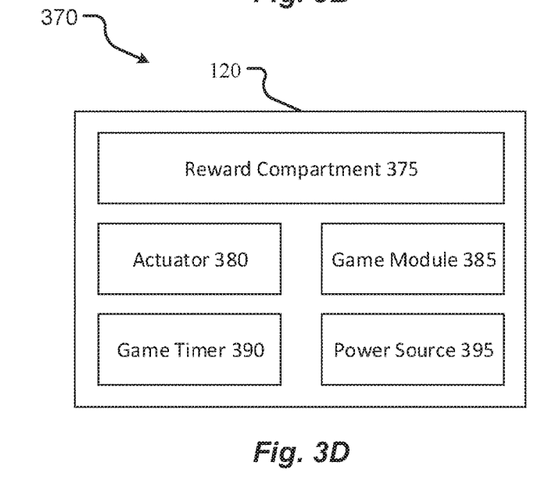
FIG. 3D illustrates a block diagram of a game device in accordance with at least one embodiment of the present disclosure.

FIG. 3C illustrates a top view 360 of a game device 120 in accordance with at least one embodiment of the present disclosure. The top view 360 of the game controller 110 may include a reclosable hatch 365 that may be used to provide a reward upon successfully solving the game puzzle. For example, the reclosable hatch 365 may be spring loaded and provide a shower of confetti as a reward, as described in FIG. 2C.

FIG. 3D illustrates a block diagram 370 of a game device 120 in accordance with at least one embodiment of the present disclosure. The block diagram 370 of the game device 120 may include a reward compartment 375, an actuator 380, a game module 385, a game timer 390, and a power source 395.

The reward compartment 375 may contain the reward that is provided upon successfully solving the game puzzle and be coupled to the reclosable hatch 365, as shown in FIG. 3C, to allow players access to the reward. The actuator 380 may be a mechanism (e.g., a release valve) to open the reclosable hatch 365 by unlatching a hook (not shown). The reward may include providing candy from the reward compartment 375, shower of confetti from the reward compartment 375, a display of lights (e.g., flashing the series of LEDs 315, 320, and/or 325), vibration (e.g., using a tactile haptic feedback device), conspicuous sounds via the speaker 310, and/or the like.

Figure 6:
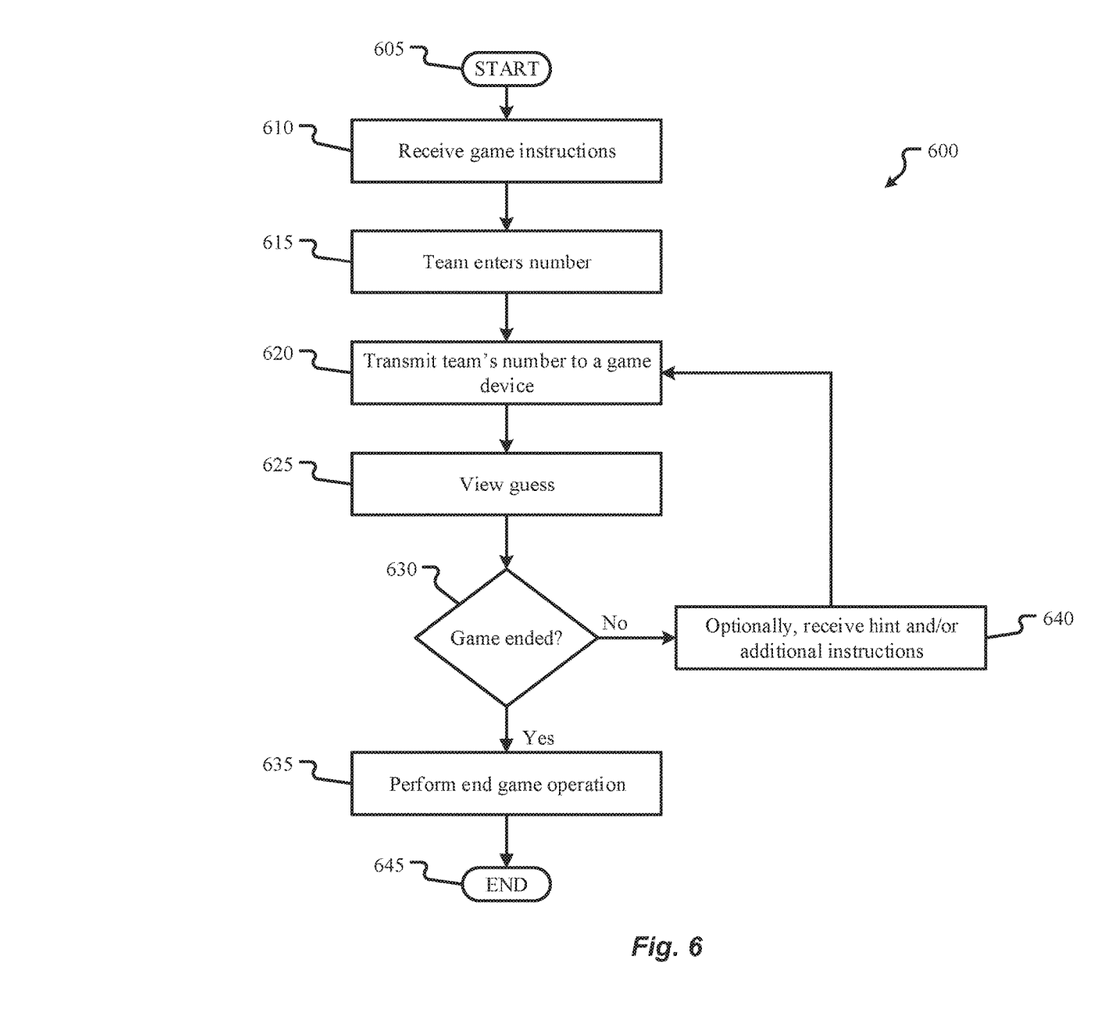
FIG. 6 illustrates another method according to at least one example embodiment.

The game module 385 may perform the communication and logic functions required by the game device 120, including the method illustrated in FIG. 6, by executing instructions stored in working memory 436 and executed by the CPU(s) 408, as illustrated in FIG. 4.

The power source 395 may include a battery located in a battery compartment 355. Additionally or alternatively, a power converter circuit (not shown) may be used to convert an external power source to a source of power required by the game device 120.

The game timer 390 may limit the time period that the teams of players may provide input numbers to the game device 120. As discussed previously, the teams of players may enter numbers periodically or continuously. When the teams of players enter numbers periodically, the input timer 275, as shown in FIG. 2D, may synchronize the teams input and the game timer 390 timeout period may be a multiple of the input timer 275 timeout period. For example, teams of players may be permitted to enter ten sets of numbers resulting in the game timer 390 timeout period being ten times longer than the input timer 275 timeout period.

FIG. 4 illustrates one embodiment of a system 400 upon which the game modules, user endpoint devices, computing devices, or other systems or components described herein may be deployed or executed. The system 400 is shown comprising hardware elements that may be electrically coupled via a bus or network 404. The hardware elements may include one or more central processing units (CPUs) 408; one or more input devices 412 (e.g., switches, a mouse, a keyboard, etc.); and one or more output devices 416 (e.g., an LED, a display device, a printer, etc.). The system 400 may also include one or more storage devices 420. By way of example, storage device(s) 420 may be disk drives, optical storage devices, solid-state storage devices such as a random access memory (RAM) and/or a read-only memory (ROM), which can be programmable, flash-updateable and/or the like.

The system 400 may additionally include a computer-readable storage media reader 424; working memory 436, which may include RAM and ROM devices as described above; and a communication interface 428 (e.g., a modem, a network card (wireless or wired), an infra-red communication device, etc.). The system 400 may also include a processing acceleration unit 432, which can include a DSP, a special-purpose processor, and/or the like.

The computer-readable storage media reader 424 can further be connected to a computer-readable storage medium, which computer-readable storage medium (as well as, in some embodiments, storage device(s) 420) may represent remote, local, fixed, and/or removable storage devices and storage media for temporarily and/or more permanently containing computer-readable information. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The system 400 may also comprise software elements, shown as being currently located within a working memory 436, including an operating system 440 and/or other code 444, including code to perform the methods illustrated in FIGS. 5 and/or 6. It should be appreciated that alternate embodiments of a system 400 may have numerous variations from the embodiments described above. For example, customized hardware might also be used and/or particular elements might be implemented in hardware, software (including portable software, such as applets), or both. Further, connection to other computing devices such as network input/output devices may be employed.

Examples of the processor 408 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The communication interface 428 may permit data to be exchanged with the communication network 140, another network, and/or any other computing device described above with respect to the computer environments described herein. Communication interface 428 may support networking technologies such as Wi-Fi, Bluetooth©, ZigBee, Ethernet, LTE, and/or GSM, and/or may utilize a dedicated Ethernet connection, fiber optics, and/or other wired or wireless network connections.

FIG. 5 illustrates a method 500 according to at least one example embodiment. The method 500 may be carried out by the CPUs 408 executing instructions stored on the working memory 436, for example. The CPUs 408 and working memory 436 may be components comprising the game device 120. In some embodiments, one or more game controllers 110 comprise the game device 120.

The method 500 starts at operation 505. In operation 510, the method 500 may include an instructor 130 entering the puzzle solution and selecting the game mode of the game device 120. Additionally or alternatively, the solution and/or the mode may be selected randomly, or the teams of players may provide input as to the selection of the game mode.

In operation 515, the method 500 may include an instructor 130 providing game instructions to two or more teams of players. If a team of players is in the room with the instructor, then the instructors may be heard directly. Alternatively, the instructions may be produced over the speak 210 of the game controller 110 and/or the speaker 310 of the game device 120. In some embodiments, the instructor 130 is a recording of an instructor. After providing instructions, a game play timer (e.g., game timer 390, as shown in FIG. 3D) is started.

In operation 520, the method 500 may include receiving from the game controllers 110 the teams of players' numbers. In operation 525, the method 500 may include performing one or more mathematical and/or logic operations on the submitted numbers from the teams of players to compute a guess.

In operation 530, the method 500 may include displaying the guess that was computed from the numbers by the game device 120 to allow all of the teams of players. The guess may be displayed on the screen 305, spoken over the speaker 310, and/or spoken over the speaker 210 of each game controller 110. The teams of players may then enter or submit one or more new binary number to be used to calculate the next guess.

At test 535, the method 500 may determine whether the computed guess is equal to the solution provided at the beginning of the game session. If the guess does not match the solution (i.e., the test 535 is NO), then the method 500 transitions to test 545. If the guess matches the solution (i.e., the test 535 is YES), the method 500 transitions to operation 540 where a reward operation is performed. The reward operation may be performed by the game device 120 (e.g., releasing a shower of confetti from the re-closable hatch 365). Alternatively, the reward operation may be performed by one or more of the game controllers 110 (e.g., releasing a shower of confetti from the re-closable hatch 250). After providing the reward, game play ends at operation 570.

Following the determination that the guess does not match the solution at test 535, at test 545, the method 500 may determine whether the time period has expired for game play. If the game play time period has expired (i.e., the test 545 is YES), then an end game operation is performed in operation 550 followed by game play ending at operation 570. If the game play time period has not expired (i.e., the test 545 is NO), then the method 500 transitions to test 555.

At test 555, the method 500 determines whether a hint and/or more instructions may be provided. If a hint and/or more instructions may be provided (i.e., the test 555 is YES), then a hint and/or additional instructions are provided in operation 560 and the method 500 transitions to operation 520. If a hint and/or more instructions may not be provided (i.e., the test 555 is NO), then the method 500 transitions to operation 520.

FIG. 6 illustrates a method 600 according to at least one example embodiment. The method 600 may be carried out by the CPUs 408, as shown in FIG. 4, executing instructions stored on the working memory 436, for example, of a game controller 110.

The method 600 starts at operation 605. In operation 610, the method 600 may include receiving instructions from an instructor 130 and/or from a recording. In operation 615, the team enters a number (e.g., binary number). In operation 620, the game controller 110 transmits the team's number to the game device 120. In operation 625, the team may view the guess that was computed from all of the teams' submitted numbers.

At test 630, the method 600 may determine whether the game session has ended (e.g., the timer expired, the maximum number of guesses has been reached, etc.). If the game session has ended (i.e., the test 630 is YES), then the method 600 transitions to end game operation 635 where the end game operation is performed and game play ends at operation 645. The game session may end when the computed guess equals the game solution or when the game timer (e.g., game timer 390) time period expires. When the guess equals the game solution, the end game operation 635 provides a reward to the teams of players. The reward operation may be performed by the game device 120 (e.g., releasing a shower of confetti from the re-closable hatch 365). Alternatively, the reward operation may be performed by one or more of the game controllers 110 (e.g., releasing a shower of confetti from the re-closable hatch 250). When the game ends after the game timer expires, the end game operation 635 may provide an audible sound, light display, and/or physical vibration to indicate the game has ended without a reward.

If the game session has not ended (i.e., the test 630 is NO), the method 600 transitions to operation 640 where, optionally, a hint and/or additional instructions are provided. The method 600 continues at operation 615 where the team enters the next number to submit to the game device 120.

At least one example embodiment is directed to a method including receiving, via a processor of a game device, a first set of two or more numbers; computing, via the processor and based on the first set of two or more numbers, a first guess; displaying, via the processor, the first guess; and determining, via the processor, that the first guess does not equal a puzzle solution.

According to at least one example embodiment, prior to receiving the first set of two or more numbers, the method further comprises: providing game instructions.

According to at least one example embodiment, an instructor provides the game instructions.

According to at least one example embodiment, providing, via the instructor, a hint or additional instructions.

According to at least one example embodiment, determining that a game play time period expired; and performing, based on the game play time period expiring, an end game operation.

According to at least one example embodiment, receiving, via the processor, a second set of two or more numbers; computing, via the processor and based on the second set of two or more numbers, a second guess; displaying, via the processor, the second guess; determining, via the processor, that the second guess equals the puzzle solution; and providing, in response to determining that the second guess equals the puzzle solution, a reward.

According to at least one example embodiment, the reward is a shower of confetti from a reclosable hatch of the game device.

According to at least one example embodiment, the game device further comprising a distributed binary calculator (DBC).

According to at least one example embodiment, the DBC computes the first and second guesses by applying one or more mathematical operations on the first and second sets of two or more numbers.

At least one example embodiment is directed to a device including a processor; and a memory including instructions that when executed by the processor cause the processor to: receive a first set of two or more numbers; compute, based on the first set of two or more numbers, a first guess; cause to be displayed the first guess; and determine that the first guess does not equal a puzzle solution.

According to at least one example embodiment, prior to receiving the first set of two or more numbers, the memory further includes instructions that cause the processor to provide recorded game instructions to a speaker.

According to at least one example embodiment, the memory further includes instructions that cause the processor to provide a hint or additional recorded instructions.

According to at least one example embodiment, the memory further includes instructions that cause the processor to: determine that a game play time period expired; and perform, based on the game play time period expiring, an end game operation.

According to at least one example embodiment, the end game operation is an audible tone.

According to at least one example embodiment, the memory further includes instructions that cause the processor to: receive a second set of two or more numbers; compute, based on the second set of two or more numbers, a second guess; cause to be displayed the second guess; determine that the second guess equals the puzzle solution; and provide, in response to determining that the second guess equals the puzzle solution, a reward.

According to at least one example embodiment, the reward is a shower of confetti from a reclosable hatch.

According to at least one example embodiment, the device further comprising a distributed binary calculator (DBC).

According to at least one example embodiment, the first and second guesses are computed, via the DBC, by applying one or more mathematical operations on the first and second sets of two or more numbers.

At least one example embodiment is directed to a system including a display; a processor; and a memory including instructions that when executed by the processor cause the processor to: provide recorded game instructions to a speaker; receive a first set of two or more numbers; compute, based on the first set of two or more numbers, a first guess; cause to be displayed on the display the first guess; determine that the first guess does not equal a puzzle solution; provide a hint or additional recorded instructions; receive a second set of two or more numbers; compute, based on the second set of two or more numbers, a second guess; cause to be displayed on the display the second guess; determine that the second guess equals the puzzle solution; and provide, in response to determining that the second guess equals the puzzle solution, a reward.

According to at least one example embodiment, the system further comprises a distributed binary calculator (DBC); and wherein the first and second guesses are computed, via the DBC, by applying one or more mathematical operations on the first and second sets of two or more numbers.

Any one or more of the example embodiments as substantially disclosed herein.

Any one or more of the example embodiments as substantially disclosed herein optionally in combination with any one or more other aspects/embodiments as substantially disclosed herein.

One or more means adapted to perform any one or more of the above example embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation, logic operation, or technique.

What is claimed is:

1. A method, comprising:
   receiving, via a processor of a game device, a first number from a first source;
   receiving, via the processor of the game device, a second number from a second source;
   computing, via the processor and based on the first number and the second number, a first guess;
   displaying, via the processor, the first guess; and
   determining, via the processor, that the first guess does not equal a puzzle solution.

2. The method of claim 1, wherein prior to receiving the first number, the method further comprises:
   providing game instructions.

3. The method of claim 2, wherein an instructor provides the game instructions.

4. The method of claim 3, further comprising:
   providing, via the instructor, a hint or additional instructions.

5. The method of claim 1, further comprising:
   determining that a game play time period expired; and
   performing, based on the game play time period expiring, an end game operation.

6. The method of claim 1, further comprising:
   receiving, via the processor, a third number from the first source;
   receiving, via the processor, a fourth number from the second source;
   computing, via the processor and based on the third number and the fourth number, a second guess;
   displaying, via the processor, the second guess;
   determining, via the processor, that the second guess equals the puzzle solution; and
   providing, in response to determining that the second guess equals the puzzle solution, a reward.

7. The method of claim 6, wherein the reward is a shower of confetti from a reclosable hatch of the game device.

8. The method of claim 1, wherein the game device further comprises a distributed binary calculator (DBC).

9. The method of claim 8, wherein the DBC computes the first guess by applying one or more mathematical operations on the first and second numbers.

10. A device, comprising:
    a processor; and
    a memory including instructions that when executed by the processor cause the processor to:
    receive a first number from a first source;
    receive a second number from a second source;
    compute, based on the first number and the second number, a first guess;
    cause to be displayed the first guess; and
    determine that the first guess does not equal a puzzle solution.

11. The device of claim 10, wherein, prior to receiving the first number, the memory further includes instructions that cause the processor to provide recorded game instructions to a speaker.

12. The device of claim 11, wherein the memory further includes instructions that cause the processor to provide a hint or additional recorded instructions.

13. The device of claim 10, wherein the memory further includes instructions that cause the processor to:
    determine that a game play time period expired; and
    perform, based on the game play time period expiring, an end game operation.

14. The device of claim 13, wherein the end game operation is an audible tone.

15. The device of claim 10, wherein the memory further includes instructions that cause the processor to:
    receive a third number from the first source;
    receive a fourth number from the second source;
    compute, based on the third number and the fourth number, a second guess;

cause to be displayed the second guess;
determine that the second guess equals the puzzle solution; and
provide, in response to determining that the second guess equals the puzzle solution, a reward.

16. The device of claim 15, wherein the reward is a shower of confetti from a reclosable hatch.

17. The device of claim 10, further comprising a distributed binary calculator (DBC).

18. The device of claim 17, wherein the first guess is computed, via the DBC, by applying one or more mathematical operations on the first and second numbers.

19. A system, comprising:
a display;
a processor; and
a memory including instructions that when executed by the processor cause the processor to:
provide recorded game instructions to a speaker;
receive a first number from a first source;
receive a second number from a second source;
compute, based on the first number and the second number, a first guess;
cause to be displayed on the display the first guess;
determine that the first guess does not equal a puzzle solution;
provide at least one of a hint and additional recorded instructions;
receive a third number from the first source;
receive a fourth number from the second source;
compute, based on the third number and the fourth number, a second guess;
cause to be displayed on the display the second guess;
determine that the second guess equals the puzzle solution; and
provide, in response to determining that the second guess equals the puzzle solution, a reward.

20. The system of claim 19, further comprising a distributed binary calculator (DBC); and wherein the first guess is computed, via the DBC, by applying one or more mathematical operations on the first and second numbers, and the second guess is computed, via the DBC, by applying one or more mathematical operations on the third and fourth numbers.

* * * * *